United States Patent [19]
Rickman

[11] Patent Number: 6,020,552
[45] Date of Patent: Feb. 1, 2000

[54] SHIELDED THERMOCOUPLE ASSEMBLY

[75] Inventor: Denis Dwayne Rickman, Clinton, Miss.

[73] Assignees: The United States of America as represented by the Secretary of the Army; U. S. Army Corps of Engineers, both of Washington, D.C.

[21] Appl. No.: 09/131,897

[22] Filed: Aug. 10, 1998

[51] Int. Cl.[7] .................................................. H01L 35/02
[52] U.S. Cl. .......................................... 136/230; 374/208
[58] Field of Search .............................. 136/230; 374/208

[56] References Cited

U.S. PATENT DOCUMENTS

| | | | |
|---|---|---|---|
| 4,038,105 | 7/1977 | Brandeberry et al. | 136/231 |
| 4,128,734 | 12/1978 | Straitz, III | 136/232 |
| 4,187,434 | 2/1980 | Pater, Jr. et al. | 250/515 |
| 5,348,395 | 9/1994 | Corr, II et al. | 374/135 |

*Primary Examiner*—Kathryn Gorgos
*Assistant Examiner*—Thomas H. Parsons
*Attorney, Agent, or Firm*—Luther A. Marsh

[57] ABSTRACT

A shielded thermocouple assembly includes a mounting pipe having a flange at a first end thereof and extending outwardly therefrom, and a mounting plug having a first end connected to a second end of the mounting pipe, the mounting plug having a recess in a second end thereof defined in part by a circular side wall having at least one opening therein. A fine-wire thermocouple is fixed in the mounting plug and extends into the recess. A rigid shield pipe is disposed concentrically around and spaced from the mounting pipe, the shield pipe being closed by a shield plate proximate the mounting plug second end. An inlet extends through a side wall of the shield pipe in alignment with a side wall of the mounting plug recess, and an outlet extends through the side wall of the shield pipe and is in axial alignment with the inlet. The inlet directs incoming air against a curved portion of the mounting plug which directs the incoming air around the mounting plug past the opening, from whence the air flows to the outlet and out of the assembly. Thus, the incoming air flows past the thermocouple to permit the thermocouple to sense a temperature of the incoming air, but fragments and particles carried by the incoming air are substantially routed away from contact with the thermocouple.

16 Claims, 1 Drawing Sheet

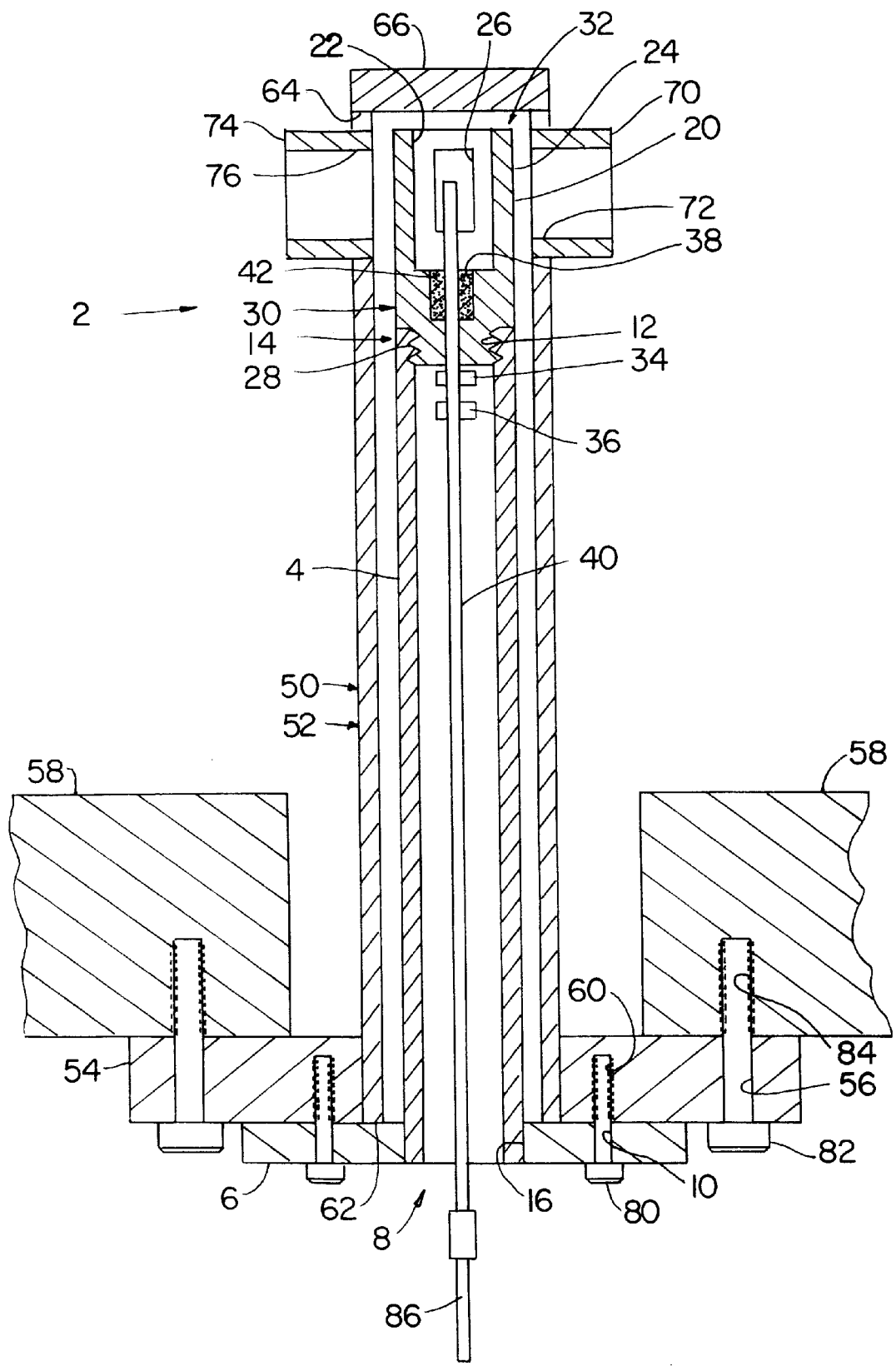

SHIELDED THERMOCOUPLE ASSEMBLY

STATEMENT OF GOVERNMENT INTEREST

The invention described herein may be manufactured and used by or for the Government for Governmental purposes without the payment to us of any royalty thereon.

BACKGROUND OF THE INVENTION (1) Field of the Invention

The invention relates to mountings for fine wire thermocouples and is directed more particularly to a mounting for use with thermocouples subject to detonation of high explosives, the mounting serving to shield the thermocouple from shock waves and from impaction by solid fragments and particles.

(2) Description of the Prior Art

The U.S. Department of Defense conducts experiments in which high temperature environments are produced by detonation of high explosives inside structures. It is often necessary to obtain a temperature history of the environment subjected to the explosive generated high temperature.

Thermocouples are typically used to measure the thermal transients produced by these experiments, in view of their simple operation and accuracy. However, thermocouple response time is directly related to the thickness of the sensing element used; i.e., the thinner the thermocouple element, the faster the response time. Fine-wire thermocouples (0.5 mil diameter) are often required to provide the necessary response time to fully capture the temperature transients of interest. Such fine-wire thermocouples are easily damaged or destroyed by airborne particles and fragments or strong air shock waves which accompany explosions. Since most fragments and the air shock occur prior to development of peak temperatures, unprotected thermocouples usually produce no useful temperature data from explosions.

Fine-wire thermocouples are often fielded in protective mounts which are designed to deflect particles and fragments from directly impacting the thermocouple element, but provide little or no protection from indirect particle impacts or air shock waves. Consequently, these protective techniques somewhat enhance measurement duration but often do not greatly improve long-term thermocouple survivability or reusability. Overall, these mounts increase useful data return from near zero for unprotected thermocouples, to approximately 50 percent.

Another currently used mounting technique shields a thermocouple from fragments and air shock by completely concealing the thermocouple, which is spring loaded, behind a protective cover until the air shock pressure pulse has decayed below a predetermined level, at which time the spring-loaded thermocouple pushes the cover away and pops out into the atmosphere. This method has several disadvantages. First, the spring-loaded thermocouple may not push the cover off because of mechanical failure. Second, even if the mount performs as designed, the time at which the thermocouple arrives at its final location is unknown and the early-time atmospheric temperature is not measured. Also, internal detonations typically feature numerous air shock reflections from the walls, ceiling, and floor, any of which may destroy an exposed fine-wire thermocouple. Small debris and particulate matter tend to remain airborne for prolonged periods and pose a significant hazard to fine-wire thermocouples. Based upon a small number of uses, data returned for this design is approximately 50 percent.

Accordingly, there remains a need for a thermocouple assembly including a fine-wire thermocouple which is shielded from shock waves and debris and which is able to provide a full temperature history of the atmosphere subject to the explosion, and which has enhanced survivability.

SUMMARY OF THE INVENTION

An object of the invention is, therefore, to provide a thermocouple assembly which is protected from shock waves and debris, and which provides data return for an explosive environment near 100 percent.

A further object of the invention is to provide such an assembly which enhances substantially the survivability of a fine-wire thermocouple.

With the above and other objects in view, as will hereinafter appear, a feature of the present invention is the provision of a shielded thermocouple assembly comprising a mounting pipe having a flange at a first end thereof and extending outwardly therefrom, and a mounting plug having a first end connected to a second end of the mounting pipe, the mounting plug having a recess in a second end thereof defined in part by a circular side wall having at least one opening therein. A fine-wire thermocouple is fixed in the mounting plug and extends into the recess. A rigid shield pipe is disposed concentrically around and spaced from the mounting pipe, the shield pipe being closed by a shield plate proximate the mounting plug second end An inlet extends through a side wall of the shield pipe in alignment with a side wall of the mounting plug recess, and an outlet extends through the side wall of the shield pipe and is in axial alignment with the inlet. The inlet directs incoming air against a curved portion of the mounting plug which directs the incoming air around the mounting plug past the at least one opening, from whence the air flows to the outlet and out of the assembly. Thus, the incoming air flows past the thermocouples to permit the thermocouple to sense a temperature of the incoming air, but fragments and particles carried by the incoming air are substantially routed away from contact with the thermocouple.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawing in which is shown an illustrative embodiment of the invention, from which its novel features and advantages will be apparent.

The drawing is a sectional view of one form of thermocouple assembly illustrative of an embodiment of the invention.

DESCRIPTION OF THE PREFERRED EMBODIMENT

Referring to the drawing, it will be seen that the illustrative thermocouple assembly 2 includes a mounting pipe 4 having a flange 6 at a first end 8 thereof. The flange 6 extends radially outwardly and preferably is provided with slots 10 extending therethrough. The mounting pipe 4 preferably is circular in widthwise cross-section and the flange is of an annular configuration. The mounting pipe 4 is provided with internal threads 12 at a second end 14 thereof. The mounting pipe 4 preferably is of stainless steel. In a referred embodiment, the mounting pipe is of ¾ inch diameter tubing, with a wall thickness of 0.120 inch and a length of 6.5 inches. The flange 6 is a circular stainless steel plate of about ⅜ inch thickness and about 3 inches in diameter. The flange 6 is provided with a central hole 16 in which is disposed the first end 8 of the mounting pipe 4. The mounting pipe 4 and the flange 6 preferably are welded together.

The assembly 2 further includes a mounting plug 20 which is substantially circular in cross section and preferably is of stainless steel. In the aforementioned preferred embodiment, the upper portion of the mounting plug 20, as viewed in the drawing, is of a diameter of about ½ inch and is of a length of about 2.15 inches. The top of the mounting plug 20 is open, defining a recess 22 having a wall 24 which is intact except for two opposed slots 26 (one shown in the drawing) which are about ¼ inch in width and about 1¼ inch in length. The mounting plug 20 is provided with external threads 28 at a first end 30 thereof for threaded engagement with the internal threads 12 at the second end 14 of the mounting pipe 4. The aforementioned recess 22 is disposed at a second end 32 of the mounting plug 20.

The mounting plug 20 is provided with a central threaded channel 34 for receiving and retaining a compression fitting 36 9 of nylon, or the like, which, in turn, supports a fine-wire thermocouple 40. The fine-wire thermocouple extends into the mounting plug recess 22 in a first direction (upwardly as viewed in the drawing), and extends into the mounting pipe 20 in an opposite direction (downwardly as viewed in the drawing). The mounting plug 20 may further by provided with a recess 38 extending from the recess 22 and adapted to receive a clay packing 42, or the like.

The assembly 2 still further includes a T-pipe assembly 50 including a shield pipe 52, preferably of 1¼ inch diameter stainless steel tubing with a wall thickness of about 0.125 inch, disposed concentrically around, and spaced from, the mounting pipe 4. The shield pipe 52 is fixed to a stainless steel plate 54 which may be provided with bolt holes 56 extending therethrough to facilitate attachment of the plate 54 to a support structure 58, and with threaded bores 60 for alignment with slots 10. In the aforementioned preferred embodiment, the shield pipe is about 8¼ inches in length. Preferably, the plate 54 is of circular configuration with a diameter of about six inches and a thickness of about ½ inch.

The shield pipe 52 is closed at a first end 62 thereof by the mounting pipe flange 6, and is closed at a second end 64 thereof by a shield plate 66 comprising a ¼ inch thick stainless steel disk, preferably welded to shield pipe second end 64.

Near the second end 64 of the shield pipe 52, there are provided an inlet pipe 70 and inlet orifice 72 in alignment with the wall 24 of the mounting plug recess 22. Similarly, there are provided an outlet pipe 74 and outlet orifice 76 in alignment with the inlet pipe 70 and inlet orifice 72, but disposed oppositely and opposed to an opposite portion of the mounting plug recess wall 24, as shown in the drawing.

In assembly, the thermocouple 40 is secured in the mounting plug 20 by the compression fitting 36. The mounting plug 20 is then threadedly connected to the first end 30 of the mounting pipe 4. The mounting pipe 4, mounting plug 20, and thermocouple 40, assembled together, are then inserted into the shield pipe 52. Screws 80 are then inserted through the slots 10 in the flange 6 advanced into threaded bores 60 in the plate 54 to rigidly attach the T-pipe assembly 50 to the mounting pipe flange 6. Prior to tightening the screws 80, the mounting pipe 4 is rotated relative to the shield pipe 52 such that thermocouple 40 is not visible through the inlet orifice 72, thereby to insure that no direct path exists along which fragments or particles may travel to impact upon the thermocouple wire 40.

The exterior surfaces of the thermocouple assembly 2 may be coated with a ceramic-based paint or refractory coating to reduce thermal conductivity.

Typically, the plate 54 of the T-pipe assembly 50 is secured to the support structure 58, such as a wall or a column, by bolts 82 passed through bolt holes 56 in the plate 54 and advanced into the bores 84 in the support structure 58.

A thermocouple conduit or cable 86 is connected to the thermocouple wire 40 and extended from the assembly 2.

In operation, air and debris launched by detonation of an explosive is directed leftwardly at the assembly 2 from the right hand side, as seen in the drawing. The shield pipe 52 and mounting pipe 4 protect the thermocouple wire portion disposed in the mounting pipe and depending from the mounting plug 20. The air shock waves, and solid fragments and particles enter the assembly by way of the inlet pipe 70 and inlet orifice 72, which produce unidirectional flow toward the mounting plug recess wall 24, which is curved and further deflects the incoming air stream around the recess wall and past the slots 26 which are perpendicular to the flow direction.

The arrangement described above protects fine-wire thermocouples by having no line of sight path along which fragments or air shock waves might travel to impact the wire element. The arrangement suppresses reflections of fragments and/or air shocks directed toward the wire. The arrangement permits the flow of hot air past the thermocouple which can sense the temperature of the air, but substantially routes fragments and particles carried by the air away from contact with the thermocouple. Further, the semi-circular deflecting surfaces produce drag effects which decrease the pressure at the thermocouple to less than 20 percent of the incident air shock.

Thus there is provided a shielded thermocouple assembly which provides the benefits of a fine-wire thermocouple throughout an explosion cycle, but which is substantially protected from damage from shock waves, fragments and particles, and is therefore reusable.

While the shielded thermocouple assembly has been described hereinabove with respect to use in an explosive detonation environment, and while such use is contemplated to be extremely beneficial, it is believed the arrangement described and shown in the drawing would be useful in other severe flow environments as, for example, in experiments relative to jet or rocket engine exhaust flow, wind tunnels, and the like. In general, the invention greatly enhances thermocouple data production and survivability in severe environments.

It is to be understood that the present invention is by no means limited to the particular construction herein disclosed and/or shown in the drawings, but also comprises any modifications or equivalents within the scope of the claims.

What is claimed is:

1. A shielded thermocouple assembly comprising:
   a mounting pipe having a flange at a first end thereof and extending outwardly therefrom;
   a mounting plug having a first end connected to a second end of said mounting pipe, said mounting plug having a recess in a second end thereof defined in part by a circular side wall having at least one opening therein;

a fine-wire thermocouple fixed in said mounting plug and extending into said recess;

a rigid shield pipe disposed concentrically around and spaced from said mounting pipe, said shield pipe being closed by a shield plate proximate said mounting plug second end;

an inlet extending through a side wall of said shield pipe in alignment with a side wall of said mounting plug recess; and an outlet extending through said side wall of said shield pipe and in axial alignment with said inlet;

wherein said inlet directs incoming air against a curved portion of said mounting plug which directs the incoming air around said mounting plug past said at least one opening, from whence the air flows to said outlet and out of said assembly;

whereby the incoming air flows past said thermocouple to permit said thermocouple to sense a temperature of said incoming air, but fragments and particles carried by the incoming air are substantially routed away from contact with said thermocouple.

2. The assembly in accordance with claim 1, wherein said mounting pipe second end is provided with internal screw threads for receiving said mounting plug.

3. The assembly in accordance with claim 1, wherein said flange is provided with a central opening and said mounting pipe is fixed in alignment with said opening.

4. The assembly in accordance with claim 1 wherein said mounting pipe comprises metal tubing.

5. The assembly in accordance with claim 1 wherein said mounting plug first end is provided with external screw threads for said connection to said second end of said mounting pipe.

6. The assembly in accordance with claim 1 wherein said mounting plug at least one opening comprises two opposed openings.

7. The assembly in accordance with claim 6 wherein said openings comprise elongated slots removed from alignment with said inlet.

8. The assembly in accordance with claim 7 wherein said slots each face in a direction normal to an axis of said inlet.

9. The assembly in accordance with claim 8 wherein said mounting plug is of metal.

10. The assembly in accordance with claim 8 wherein said slots are each aligned with said thermocouple.

11. The assembly in accordance with claim 1 wherein said fine-wire thermocouple is retained in a compression fitting which is fixed in said mounting plug.

12. The assembly in accordance with claim 1 wherein said shield pipe is of metal tubing.

13. The assembly in accordance with claim 12 and further comprising a plate fixed to a first end of said shield pipe and adapted for connection to said mounting pipe flange, and further adapted for connection to a supporting structure.

14. The assembly in accordance with claim 1 wherein said inlet comprises an inlet orifice extending through said side wall of said shield pipe, and an inlet pipe fixed in said inlet orifice and extending outwardly therefrom and configured and disposed to guide the incoming air into engagement with said curved portion of said mounting plug.

15. The assembly in accordance with claim 14 wherein said outlet comprises an outlet orifice and an outlet pipe fixed in said outlet orifice and extending outwardly oppositely from said inlet pipe and in axial alignment with said inlet pipe.

16. The assembly in accordance with claim 1 wherein said mounting pipe, said mounting plug, and said shield pipe are of stainless steel.

* * * * *